Figure 4:
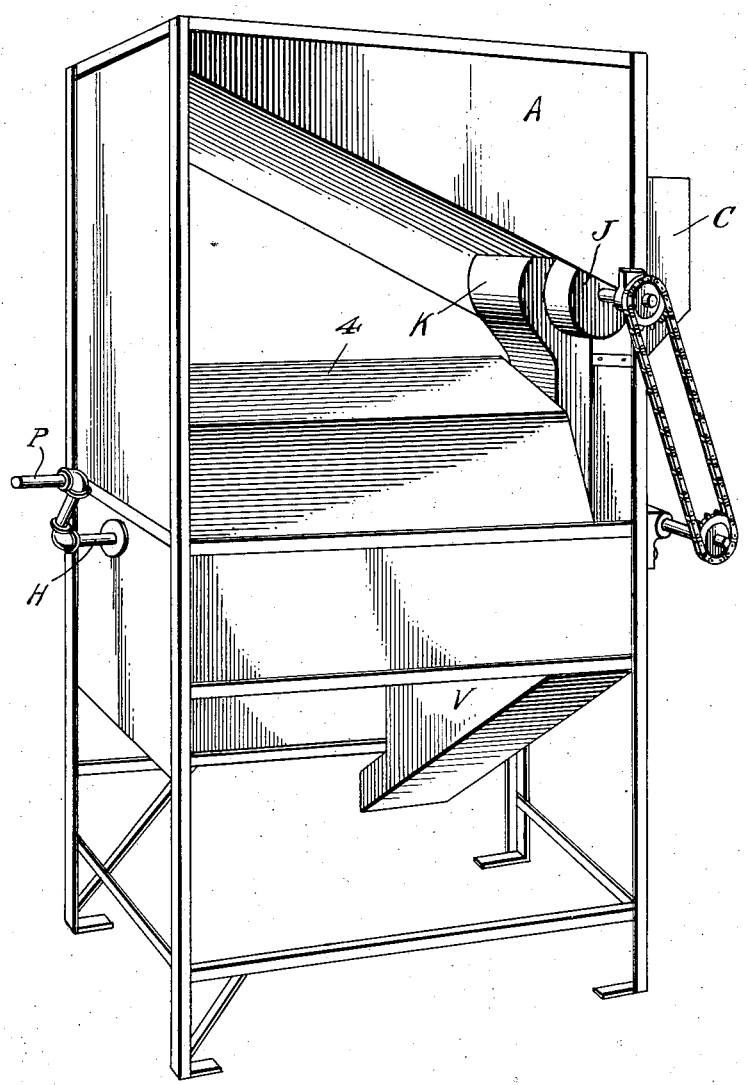

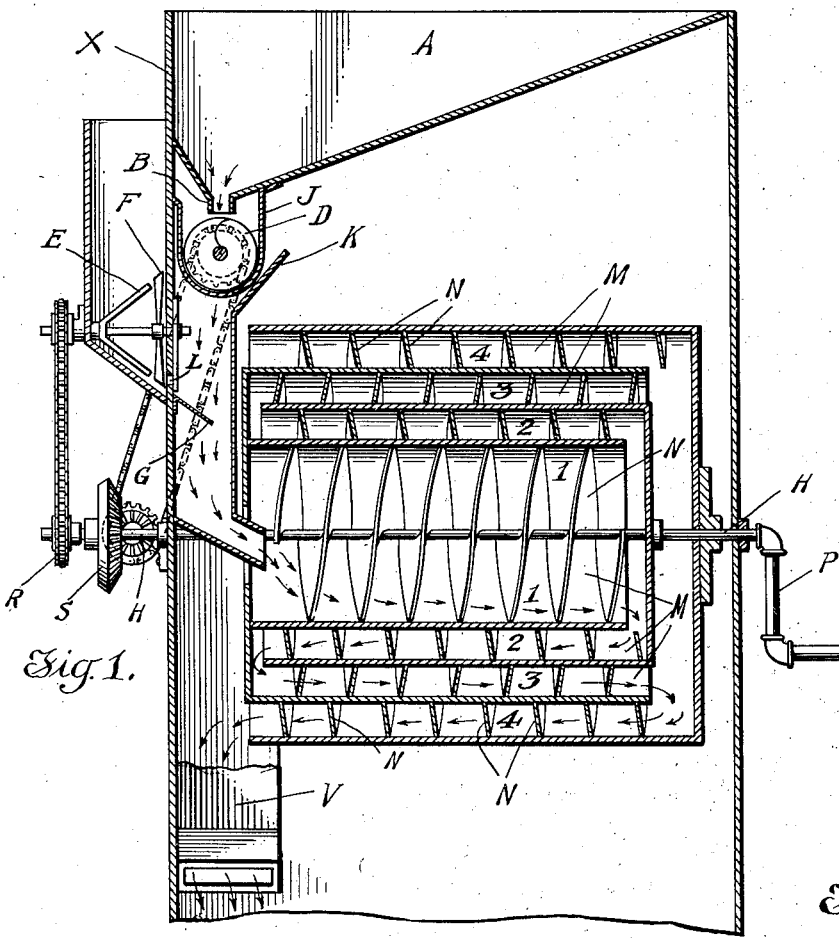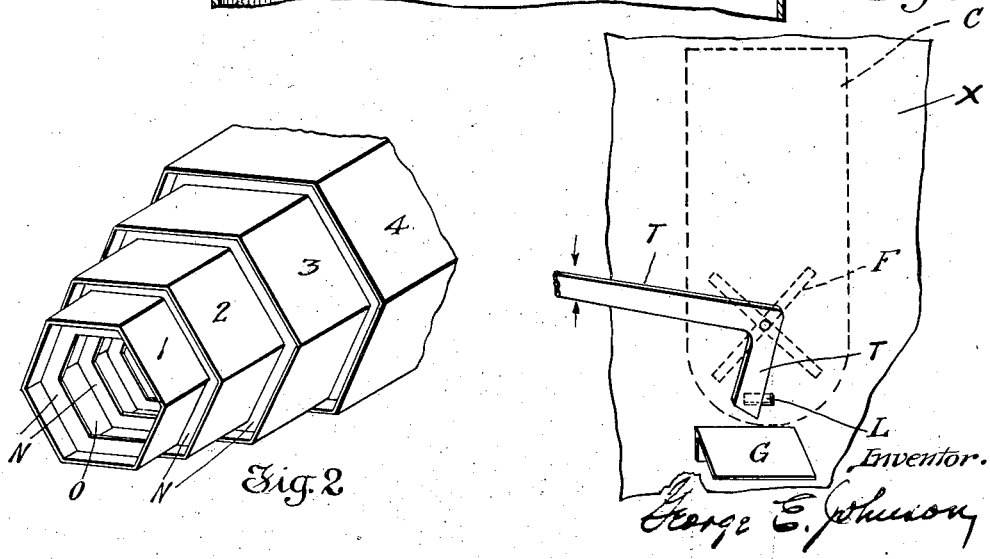

Patented Sept. 18, 1934

1,973,812

UNITED STATES PATENT OFFICE 1,973,812

SEED TREATING MACHINE

George E. Johnson, Kansas City, Mo.

Application September 12, 1930, Serial No. 481,393

3 Claims. (Cl. 83—28)

The invention relates to improvements in seed treating machines in which wheat or other grain seed is treated or coated with a prepared dust, such as copper carbonate, to prevent smut or other disorders after seed is planted for the new crop; the efficiency of the treatment being dependent on the thoroughness with which each grain or seed is coated.

The objects of the improvements are to provide for a continuous flow of seed from hopper, with stated quantity to be admitted, treated and discharged simultaneously and automatically with each revolution of the treating drum assembly, and automatic cessation of the feeding, treating and discharging processes when rotation of drums is stopped. The process of treating being definitely accomplished through the mixing of seed with the prescribed amount of treating compound, and being agitated, rolled and rubbed together in a definite manner, through a definite course and a definite number of revolutions to insure a perfect coating of each grain seed as it moves by gravity through the spiral ducts formed in the treating drums by spiral rib flights, each one of which is represented by one revolution of the treating drums. The construction design of the drums assembly does not limit the length of same or the number of spiral flights that may be added for a more prolonged treating period.

My invention is illustrated in the accompanying drawings, Sheet 1 and Sheet 2 in which Figure I is a cross section drawing of the machine. Figure II is a perspective of a number of partly assembled drums in telescope formation to better show the relative position of the assembly in Figure I. Figure III discloses the means for feeding and regulating the treating powder. Figure IV is a view of the assembled machine showing relative positions of assembled parts.

Further describing my invention, I have designed my seed treating machine for continuous flow of seed from hopper, (A) through neck, (B) spiral conveyor (D) and seed hopper discharge chute where the discharge outlet of powder hopper (C) communicates with said chute. Seed and treating powder pass by gravity into the innermost drum (1) of a series of polygonally shaped, concentrically spaced, telescoped drums, (1) (2) (3) (4) mounted on and turning with a horizontal driving shaft (H), said series of drums having axial inlets and outlets respectively, the outlet of each inner drum communicating with the inlet of the next outer drum, said drums being provided with inner surfaces of fabric (O) and spiral ribs (N) to cause seed to roll in the movement of seed and powder from the inlet to the discharge end of the respective drums and finally into the discharge chute, (V) communicating with the outlet of the outermost drum (4). Volume capacity and feeds of seed and treating powder are automatically controlled by the speed of the revolving drums and driving shaft, integral with gearing and chains operating said feeds to actuate delivery of a given quantity of seed from hopper and spiral conveyor (D) and an accurate set amount of the treating powder from powder hopper (C) with each revolution of said drums, or to arrest the feeding, treating and discharge processes when revolving of drums cease. A neck (B) extending from discharge opening of seed hopper (A) to within clearance distance of spiral conveyor (D) operating in trough or open top liner (J) is designed to prevent flow of seed from hopper only when said spiral conveyor is in action; likewise, the discharge opening (L) of powder hopper (C) being on the side of said hopper, prevents powder from sifting through or dropping from said powder discharge opening only when powder feeding blades (F) are in action. The flat inner wall sections of the treating drums are so constructed to lift and dump the seed and treating powder many times throughout the treating process, for example, seed that has fallen by gravity to the lowermost flat section of the rotating drums is retained thereon, momentarily, while being lifted or moved backward to a point of rotation where the pitch degree of said flat section of drum causes spilling or dumping of seed, by gravity, onto other flat sections of drums, where the lifting and dumping processes are repeated. This action or movement of seed in process of treating shortens the time ordinarily required for perfect coating on the seed grains, and the spiral ducts (M) formed by the spiral ribs (N) provide a stipulated course through which each grain of seed must pass with not less than a stipulated number of revolutions of the treating drums before the said grain of seed reaches the discharge chute (V).

Having thus described my invention, what I claim as new and patentable in my seed treating machine is:

1. In a seed treating machine, a seed hopper, a means for control and delivery of seed from said seed hopper, a seed discharge chute for said seed hopper, a treating powder hopper, means for feeding, regulating and controlling delivery of treating powder from said powder hopper, said powder hopper communicating with said seed hopper discharge chute; a plurality of polygonally shaped, concentrically spaced seed and powder mixing and agitating drums, said drums being mounted on a horizontal driving shaft for rotation thereof, said drums being provided with axial inlets and outlets respectively for admittance and delivery of seed and treating powder, the inlet of the radially innermost drum communicating with said seed hopper discharge chute and the outlet of each inner drum respectively, communicating with the inlet of the next outer drum and thus provide definite, continuous, forward movement of seed, grain or other material as it moves by gravity from one drum into another drum and so on through the assembly of drums into the final discharge chute, which communicates with the outlet of the outermost drum; means provided for rotation of said drums.

2. In a seed treating machine, a structure as specified in claim 1, said plurality of polygonally shaped, concentrically spaced seed and powder mixing and agitating drums being graduated in sizes and assembled in telescope formation.

3. In a seed treating machine, a seed hopper, a mechanical means for control and delivery of seed from said hopper, a discharge chute for said seed control means, a treating powder hopper communicating with said discharge chute, a means for the control and delivery of treating powder from the powder hopper to the discharge chute, a polygonally shaped seed and powder mixing and agitating drum providing inner longitudinally extending flat walls, a fabric lining on said walls, said drum being mounted on a horizontal driving shaft, said drum having an axial inlet and an axial outlet, said inlet, communicating with the discharge chute, and ribs mounted on the inner walls of said drum in spiral formation to cause movement of the seed and powder through the drum.

GEORGE E. JOHNSON.